(12) United States Patent
Gregory

(10) Patent No.: US 7,936,469 B2
(45) Date of Patent: May 3, 2011

(54) SYSTEM AND METHOD FOR DISTRIBUTED PRINTER PROCESSING

(75) Inventor: Richard T. Gregory, Nampa, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2487 days.

(21) Appl. No.: 10/749,525

(22) Filed: Dec. 31, 2003

(65) Prior Publication Data

US 2005/0146742 A1    Jul. 7, 2005

(51) Int. Cl.
*G06F 3/12* (2006.01)
*G06K 15/00* (2006.01)
*H04N 1/40* (2006.01)

(52) U.S. Cl. ....... 358/1.15; 358/1.1; 358/448; 358/1.18; 358/1.13

(58) Field of Classification Search .......... None
See application file for complete search history.

(56) References Cited

U.S. PATENT DOCUMENTS

| | | | |
|---|---|---|---|
| 5,768,489 A * | 6/1998 | Adachi et al. | 358/1.18 |
| 5,808,747 A * | 9/1998 | Telle | 358/296 |
| 6,151,131 A * | 11/2000 | Pepin et al. | 358/1.13 |
| 6,198,543 B1 * | 3/2001 | Ryan | 358/1.9 |
| 6,411,396 B1 * | 6/2002 | Benson et al. | 358/1.18 |
| 7,099,027 B1 * | 8/2006 | Barry et al. | 358/1.15 |
| 7,161,705 B2 * | 1/2007 | Klassen | 358/1.18 |
| 7,180,626 B1 * | 2/2007 | Gassho et al. | 358/1.6 |
| 7,551,299 B2 * | 6/2009 | Ferlitsch | 358/1.13 |
| 7,847,967 B2 * | 12/2010 | Ferlitsch | 358/1.16 |
| 2003/0007818 A1 * | 1/2003 | Kato | 400/61 |
| 2004/0158654 A1 * | 8/2004 | Shima | 710/8 |
| 2004/0196496 A1 * | 10/2004 | Klassen | 358/1.15 |
| 2006/0023239 A1 * | 2/2006 | Ferlitsch | 358/1.13 |

* cited by examiner

*Primary Examiner* — Edward L Coles
*Assistant Examiner* — Hilina S Kassa

(57) ABSTRACT

The invention provides a system and method for the distributed processing of print jobs using multiple printer processors and centralized printing. The method can include the operation of dividing the print job into a plurality of print job segments in a print distribution module. The plurality of print job segments is transmitted to one or more distribution responsive printers. A further operation can be processing the plurality of print job segments using the one or more distribution responsive printers. Another operation is receiving the plurality of print job segments from the one or more distribution responsive printers into the print distribution module. In addition, the plurality of print job segments is printed at a target printer.

31 Claims, 2 Drawing Sheets

SYSTEM AND METHOD FOR DISTRIBUTED PRINTER PROCESSING

FIELD OF THE INVENTION

The present invention relates generally to the processing of print jobs.

BACKGROUND

Electronic printing devices have become an integral part of many business environments. Most businesses that use paper in their workflow tend to create documents using an electronic printer and these printers are frequently connected to a computer network. Electronic printers are becoming more widely used as the technology becomes generally accepted, but the use of these printers can add up to a significant cost for any business. Every printer purchased by a business will later need maintenance, repair and network support. In order to manage these costs, businesses often purchase several printers of a similar type. This allows them to decrease the time, cost, and complexity of maintenance and repairs.

Large and medium size businesses often have certain makes and/or models of printers that are selected to do the majority of their printing. The businesses usually have several printers of the certain model distributed around the business.

Employees are generally assigned to the printer near their work area in order to optimize the employee's productivity. When an employee prints a large volume of material, or complex print jobs containing extensive graphics, even high speed printers can become bogged down. Printing a single complex job can slow down or even stop the work of other employees in that area, because the remaining print jobs have to wait. Older printers with less memory and slower processors can amplify this problem, because slower printers may even become bogged down with medium size print jobs.

Print jobs with a large amount of graphics or images can especially slow down a printer. Printers usually have processors that receive print job information and convert the information into a form that allows the printer to correctly place the ink or toner on the printed page.

Many printers have been optimized to print text pages at high speed. Graphical images, however, contain a much larger amount of information that is usually processed by the printer processor before the information can be printed. A medium sized picture may contain several megabytes of data, requiring the printer processor to rasterize a large amount of information in order to generate the points of ink or toner for the output page. The processing of this graphics information can take printers more time than the actual printing, which can cause a significant delay between the printing of each page.

Businesses have attempted to overcome the problem of printer slowdown using several methods. One method can be to place more printers around the workplace. However, this strategy can be quite costly. The increased number of printers is usually needed when large print jobs or a large volume of jobs are sent to the printers. Each extra printer purchased by a business also needs maintenance, repair, and network support.

Another method to overcome printer slowdown can be to use software to send each separate page of complex print jobs to multiple printers. This solution can become quite labor intensive because it may require someone to go to each printer to pick up the pages and hand collate the print job. The printed pages can easily become lost in the process, which wastes more time and money when the print job has to be repeated. Since the printers are often distributed around the workplace, locating the dispersed print job requires significant effort and reduces productivity.

SUMMARY OF THE INVENTION

The invention provides a system and method for the distributed processing of print jobs using multiple printer processors and centralized printing. The method can include the operation of dividing the print job into a plurality of print job segments in a print distribution module. The plurality of print job segments can be transmitted to one or more distribution responsive printers. A further operation can be processing the plurality of print job segments using the two or more distribution responsive printers. Another operation is receiving the plurality of print job segments from the one or more distribution responsive printers at the print distribution module. In addition, the plurality of print job segments is printed at a target printer.

DETAILED DESCRIPTION

Figure 1:
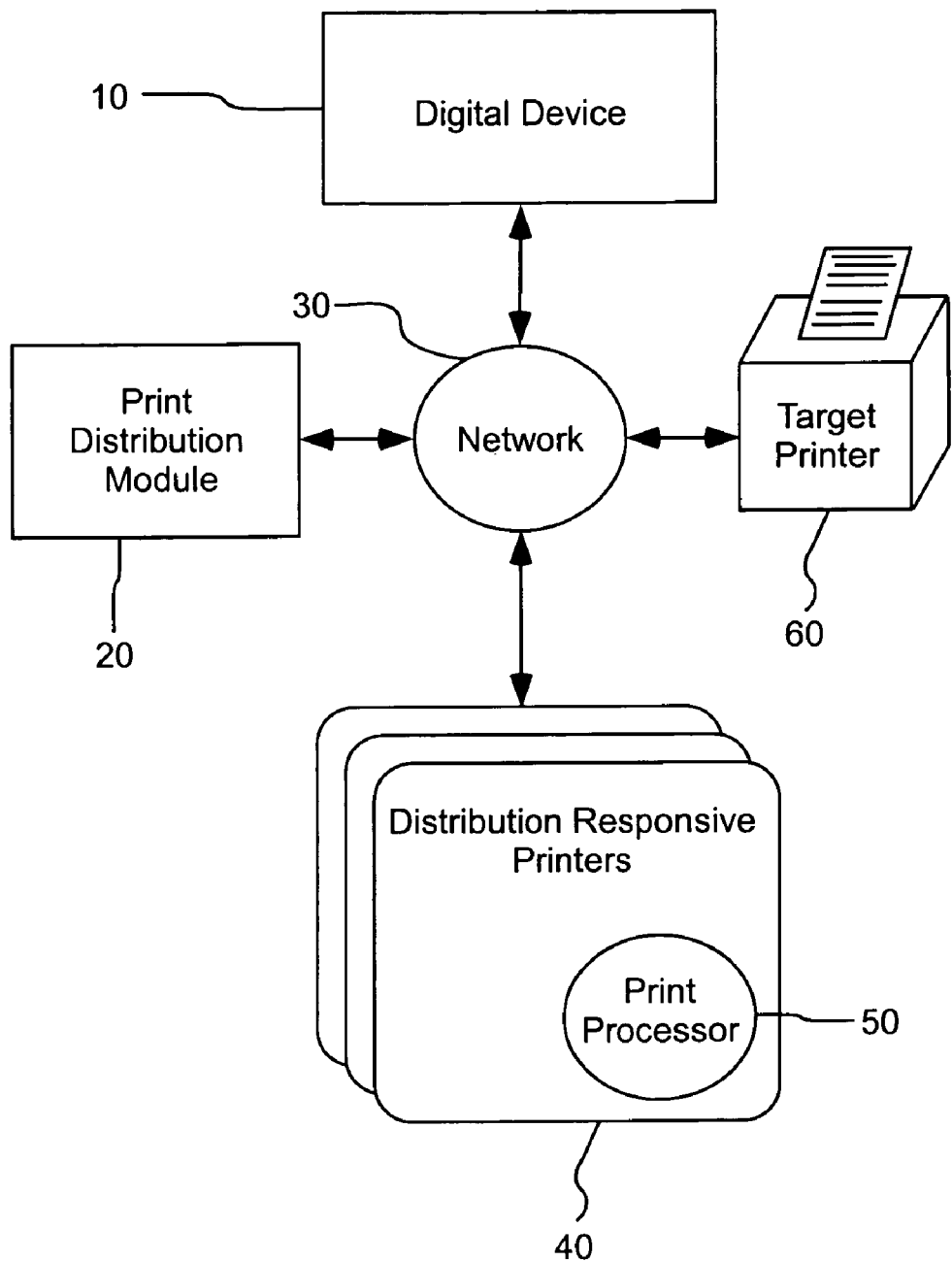
FIG. 1 is a block diagram illustrating a system for the distributed processing of print jobs using multiple print processors and centralized printing in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In order to overcome the problems described, the present invention provides a system and method for distributed printer processing, as illustrated in FIG. 1. Moreover, the present invention provides a cost effective and efficient way to increase the speed of printing without having to purchase additional or more costly printers. The system includes a print distribution module 20 in communication with two or more distribution responsive printers 40. The print distribution module can be a hardware or software device that communicates with a digital device 10 and one or more distribution responsive printers 40. The print distribution module, digital device, and distribution responsive printers can communicate through a network 30.

In one embodiment, a user can send a file from a digital device 10 to the print distribution module to be processed and printed. The digital device may be a desktop computer, a laptop computer, a handheld computer such as a Palm Pilot®, a digital camera, or another device which can connect to a network and send information to be printed. The digital device can connect to a network through a wired or wireless connection. A wired connection may be any physical connection electrically connecting the digital device to the network. A wireless connection is a connection to the network using a wireless protocol such as IEEE 802.11, Bluetooth®, ultra wideband (UWB), or the like. The digital device may also be connected directly to the print distribution module 20 without the aid of a network.

The digital device can send the file or print job to be printed to the print distribution module 20. The print distribution module can then resolve the size of the print job. If the print job consists of relatively complex or lengthy data, the print distribution module can divide the print job into a plurality of print job segments. Each of the print job segments may contain a single page, although the print job segments may be smaller or larger than a single page.

A target printer 60 can be selected by a user of the digital device 10 as the destination printer at which the print job will be printed. The target printer may also be selected by the print distribution module based on the requirements of the print job and the status of available printers on the network. If the target printer is selected by the print distribution module, then the name and/or location of the target printer can be returned to the user of the digital device.

When the print job is sent to the print distribution module, the module can detect which printers are available on the network. The list of available printers on the network may be programmed and stored in the print distribution module. Alternatively, the available printers may be dynamically selected using the print distribution module to poll the network and determine which printers are currently on the network, and whether they are currently busy with another print job. The operational state of each printer can then be determined by the print distribution module. The operational state includes whether each printer is busy processing print jobs and may include the model of each printer on the network.

If a printer on the network is not busy, it may be available to the print distribution module. If a printer has several print jobs waiting to be processed and printed, the printer may be listed as busy and may not be available to the print distribution module. If a printer does not have print jobs waiting to be printed, it may optionally be available to the print distribution module. Whether a printer is available to the print distribution module can be established in advance using software or firmware, or the user of the digital device 10 may select which printers will be used to process and/or print a large print job. The list of available printers may also be controlled by a network administrator.

The print distribution module 20 can compare the target printer 60 with the available network printers to determine which printers can be used to process the current print job. For instance, a color or monochrome printer may be desired. The print distribution module can determine which of the available printers are capable of processing the current job. The print distribution module can select distribution responsive printers of a similar make and/or model as the target printer. Alternatively, it may be desirable to keep certain printers free from being shared on the network. Therefore, software, firmware or hardware can be available to keep certain printers on the network from being used by the print distribution module.

The print distribution module 20 can select one or more of the distribution responsive printers 40 based on pre-determined criteria. In order for a distribution responsive printer to be selected, the selected printer should be able to process the same printing languages as the target printer. For instance, if a user selects a color laser printer as the target printer, the print distribution module can then select other color laser printers on the network that can process the color laser printer instructions. The selection may be further constrained by different models of color printers. An older laser printer may not use the same commands or instructions as a newer laser printer.

Alternatively, the distribution responsive printers 40 may have their firmware, software, or hardware upgraded, in order to configure the printers to be able to print a variety of common print languages, including generic print languages understood by a large number of printers. Software upgrades can also be distributed to printers to enable each distribution responsive printer to receive a print job and process the print job without printing it. In one embodiment, the printer firmware can be modified to allow the print jobs to contain a mixture of printer languages. Examples of printer languages are the page description languages (PDL), which includes the printer command language (PCL), PostScript, and portable document format (PDF). Print job files written in these printer languages can be converted by the printer processor into print engine ready data. The target printer may be a distribution responsive printer, but this is not a requirement of the present invention. The target printer can also have its firmware modified to allow print jobs to contain a mixture of PDL and engine-ready data.

Once the distribution responsive printers 40 have been selected, the plurality of print jobs can be transmitted for separate processing. In one embodiment, the plurality of print job segments can be divided by the print distribution module 20 between the available distribution responsive printers with each available printer receiving one or more of the plurality of print job segments. Each distribution responsive printer can then process the print job segments using its print processor 50. The processing converts each print job segment from the print job's source language into print engine-ready data. Print engine-ready data is data that can be used by the target printer to directly print a job, without having to perform substantial processing. In another embodiment, the print distribution module can send a first page to the target printer to be processed and printed. Then, the remainder of the plurality of print job segments can be transmitted to at least one of the distribution responsive printers to be processed.

After processing, the print engine-ready data can be received from the distribution responsive printers 40 by the print distribution module 20. In one embodiment, the print distribution module can query the distribution responsive printers for the print engine-ready data. Once of the print job segments have been processed into print engine-ready data, the distribution responsive printers can send the requested data back to the print distribution module.

In yet another embodiment, each distribution responsive printer that receives a plurality of print job segments can respond with print engine-ready data to the print distribution module without being queried. For example, after each individual print job segment has been processed by its respective print processor 50, the plurality of print job segments that are now processed to engine-ready data can be transmitted to the print distribution module within a determined time frame. In yet another embodiment, each distribution responsive printer that received print job segments can process the print job segments with its print processor and transmit engine-ready data to the print distribution module as soon as engine ready data is available.

The print distribution module can then assemble the engine ready data received from the distribution responsive printers and arrange it in an order to be printed. One embodiment is to arrange the engine ready data so that it can be printed in the data's original order before it was distributed. However, the pages or job segments can be arranged in any desired order. Print engine-ready data can then be transmitted to the target printer, where the pages can be immediately printed with a reduced use of the target printer's print processor.

The print distribution module 20 may perform all of the tasks typical of a print server. In addition to performing the tasks of a print server, the print distribution module can be aware of the make, model, and status of each distribution responsive printer connected to the network. When a print job is submitted, the print distribution module can parse the print job data to determine each page boundary within the job. Each page may be a print job segment. The print distribution module can then open a connection to other printers which process data of the same type as the target printer, and send each available printer the print job segment(s) or pages to be processed by that printer.

The print distribution module may be a print server with software or firmware upgraded to accomplish the additional tasks discussed above. The print distribution module may also be software in the user's digital device 10 which allows the digital device to manage the print job as discussed above. Moreover, load balancing can be performed for printers connected to the network using the present invention. The print distribution module can also be a self-contained unit attached to the network that can perform the tasks necessary to accomplish distributive printer processing with centralized printing or it may be integrated into a particular server or printer.

Figure 2:
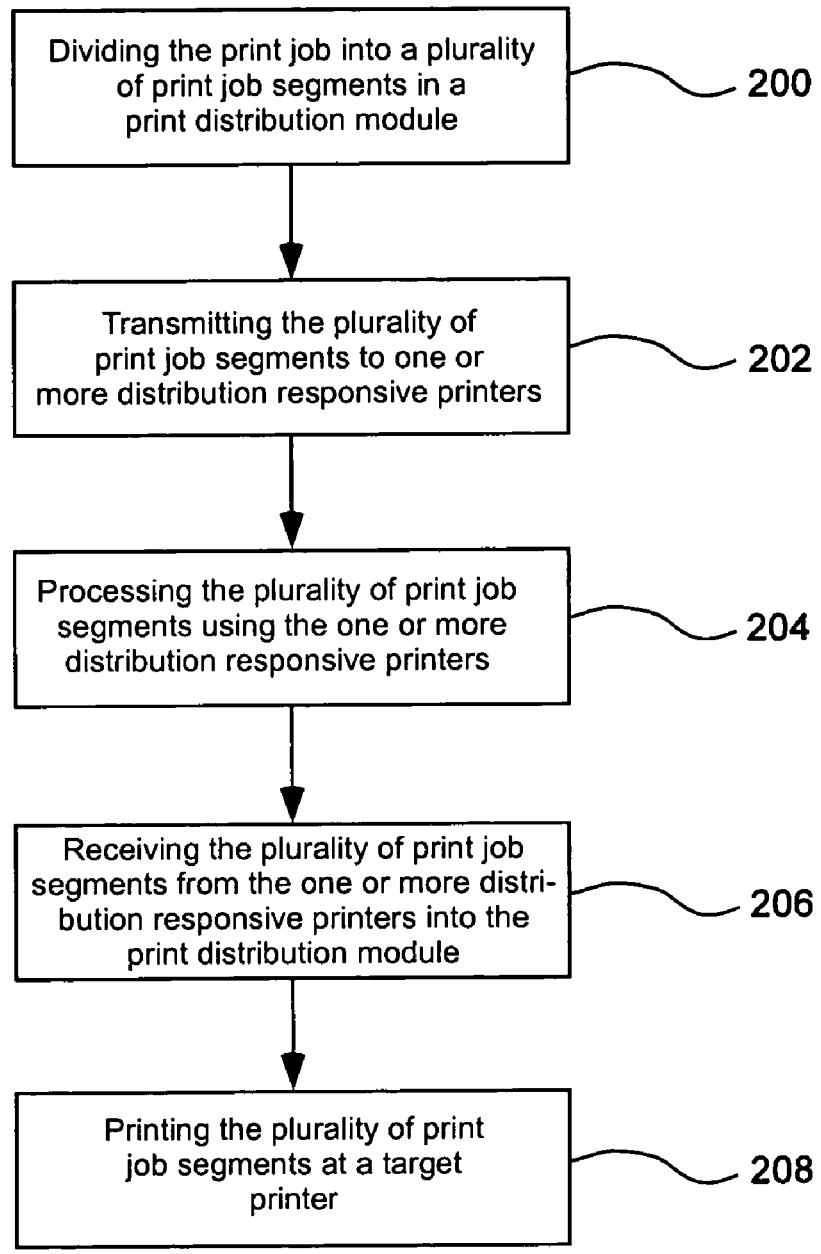
FIG. 2 is a flow chart depicting a method for distributed processing of print jobs using multiple print processors and centralized printing in an embodiment of the invention.

Another embodiment of the invention provides a method for the distributed processing of print jobs using multiple printer processors and centralized printing as depicted in the flow chart of FIG. 2. The method includes the operation of dividing the print job into a plurality of print job segments in a print distribution module as in block 200. This dividing of the print job may be done so that each divided part or print job segment can be a single printed page, a group of pages, or individual images. The print job may originate from a digital device connected to the network, either through a wired or wireless connection. A wired connection may be any physical connection electrically connecting the digital device to the network. A wireless connection is a connection to the network using a wireless protocol such as IEEE 802.11, Bluetooth®, ultra wideband (UWB) or the like. The digital device may also be connected directly to the printing system without the aid of a network.

The plurality of print job segments can be transmitted to two or more distribution responsive printers as in block 202. Before transmitting the plurality of print jobs, the print distribution server is used to determine which of the distribution responsive printers are available and capable of processing the plurality of print job segments or vice-versa. The print distribution server can then select those distribution responsive printers that are capable of processing the segments. One method for transmitting the print job segments involves sending the first print job segment to a target printer to be printed and sending the remaining print job segments to be divided among the one or more distribution responsive printers. If this method is used, the remaining segments of the plurality of print job segments may be divided among the target printer and one or more distribution responsive printers. The target printer itself may be a distribution responsive printer. Thus, the two or more distribution responsive printers may include the target printer and one distribution responsive printer.

A further operation is processing the plurality of print job segments using the one or more distribution responsive printers as in block 204. The print job segments are processed from the print job language into print engine-ready data, which is data the printer can use to print the page with a minimal amount of processing. An additional operation is receiving the plurality of print job segments from the one or more distribution responsive printers into the print distribution module as in block 206. This operation can involve transmitting the plurality of print job segments from the print distribution module to the target printer. The print job segments at this time are print engine-ready data, having been processed by the distribution responsive printer processors. Finally, the print job segments are printed at a target printer as in block 208. This operation may include organizing the print engine-ready data so that the print job will be printed in the original order the print job was sent in, then transmitting the engine-ready data from the print distribution module to the target printer to be printed.

The present system and method provide an effective way to increase the speed of printing without purchasing faster or more costly printers. With only a minimal investment in upgrading printer hardware, software, or firmware, a business can use its existing printer infrastructure to increase the speed of printing complex print jobs. Businesses can optimize the use of printers and employee time by using multiple printers to process a complex print job and then enable printing of that print job at a target printer convenient to the user. This invention can enable businesses to save load balance print jobs and utilize existing printer hardware more effectively and efficiently.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A method for distributed processing of print jobs using multiple printer processors and centralized printing, comprising the steps of:
dividing a print job into a plurality of print job segments in a print distribution module;
transmitting the plurality of print job segments to one or more distribution responsive printers;
processing the plurality of print job segments into a plurality of print engine-ready data segments using the one or more distribution responsive printers;
assembling the plurality of print engine-ready data segments received from the one or more distribution responsive printers at the print distribution module; and
printing the assembled plurality of print engine-ready data segments at a target printer when the plurality of segments is received from the print distribution module.

2. A method as in claim 1, further comprising the step of sending the print job from a digital device to the print distribution module.

3. A method as in claim 2, wherein the step of sending the print job from a digital device to a print distribution module further comprises the step of sending the print job from the digital device to the print distribution module through a wired connection.

4. A method as in claim 2, wherein the step of sending the print job from a digital device to the print distribution module further comprises the step of sending the print job from the digital device to the print distribution module through a wireless connection.

5. A method as in claim 2, wherein the step of sending the print job further comprises the step of sending the print job from a digital device to a print distribution module through a computer network.

6. A method, as in claim 1, further comprising the step of configuring firmware of the one or more distribution responsive printers to receive print job segments in a variety of common print languages.

7. A method as in claim 1, wherein the step of dividing the print job further comprises the step of dividing the print job into print job segments that are a single printed page.

8. A method as in claim 1, wherein the step of transmitting the plurality of print job segments further involves the step of transmitting a first print job segment of the plurality of print job segments to a target printer to be printed and transmitting remaining print job segments to the one or more distribution responsive printers.

9. A method as in claim 1, wherein the step of processing the plurality of print job segments further comprises the step of processing the plurality of print job segments using two or more distribution responsive printers.

10. A method as in claim 1, wherein the step of assembling the plurality of print engine-ready data segments further involves the step of sending the plurality of print engine-ready data segments from the print distribution module to the target printer.

11. A method as in claim 1, further comprising the step of determining which types of distribution responsive printer connected to the network will be used for processing the print job.

12. A method as in claim 11, further comprising the step of determining an operational state of each of the two or more distribution responsive printers that are connected to a network.

13. A method as in claim 12, wherein the step of transmitting the plurality of print job segments to one or more distribution responsive printers, further comprises the step of transmitting the plurality of print job segments to one or more distribution responsive printers that are determined to be a similar model as the target printer.

14. A method as in claim 12, further comprising the step of transmitting the plurality of print job segments to one or more distribution responsive printers that are determined to be available by the print distribution module.

15. A method as in claim 1, wherein the step of assembling the plurality of print engine-ready data segments further comprises the step of assembling the plurality of print engine-ready data segments from the distribution responsive printers by querying the one or more distribution responsive printers with the print distribution module.

16. A method as in claim 1 wherein the step of assembling the plurality of print engine-ready data segments further comprises the step of transmitting the plurality of print engine-ready data segments from the distribution responsive printers to the print distribution module.

17. A method as in claim 16, wherein the step of transmitting the plurality of print engine-ready data segments is performed immediately after an individual print engine-ready data segment from the plurality of print job segments has completed processing.

18. A printing system to distribute processing of print jobs using multiple printer processors and centralized printing, comprising:
 a print distribution module configured to divide a print job into a plurality of print job segments;
 a distribution responsive printer configured to receive and process one or more of the plurality of print job segments from the print distribution module into one or more print engine-ready data segments; and
 wherein the print distribution module is further configured to assemble one or more print engine-ready data segments from the distribution responsive printer after processing.

19. A system as in claim 18, wherein the print distribution module is configured to transmit a first print job segment of the plurality of print job segments to a target printer to be printed.

20. A system as in claim 19, wherein the print distribution module is configured to transmit a remainder of the print job segments to one or more distribution responsive printers.

21. A system as in claim 20, wherein the target printer is a distribution responsive printer.

22. A system as in claim 18, wherein the print distribution module is configured to divide and transmit a remainder of the print job segments between one or more distribution responsive printers and the target printer.

23. A system as in claim 18, wherein the printing system further comprises a computer network.

24. A system as in claim 23, wherein a digital device is connected to the network to send a print job.

25. A system as in claim 24, wherein the digital device is configured to transmit a print job to the print distribution module.

26. A system as in claim 18, wherein the print distribution module is configured to determine the model and status of each distribution responsive printer connected to a network.

27. A system as in claim 20, wherein the print distribution module is configured to transmit a remainder of the print job segments to one or more distribution responsive printers when the print distribution module has determined the one or more distribution responsive printers are not busy.

28. A system as in claim 20, wherein the print distribution module is configured to query one or more distribution responsive printers to which a remainder of the print job segments have been sent, and assemble the remainder of the print engine-ready data segments when one or more distribution responsive printers have completed processing the remainder of the print engine-ready data segments.

29. A system as in claim 28, wherein the print distribution module is configured to receive print engine-ready data segments from processing of a remainder of the print job segments at the distribution responsive printers as soon as the print engine-ready data segments are available.

30. A printing system to distribute processing of print jobs using multiple printer processors and centralized printing, comprising:
 a print distribution means for dividing a print job into a plurality of print job segments;
 a distribution responsive printer means for receiving and processing one or more of the plurality of print job segments from the print distribution means into one or more print engine-ready data segments;
 wherein the print distribution means is further configured to assemble one or more print engine-ready data segments from the distribution responsive printer after processing; and
 a target printer means for receiving the one or more print engine-ready data segments from the print distribution means and for printing the one or more print engine-ready data segments.

31. An article of manufacture, comprising:

a non-transitory computer usable medium having computer readable program code embodied therein for distributed processing of print jobs using multiple printer processors and centralized printing, the computer readable program code in the article of manufacture comprising:

computer readable program code for dividing a print job into a plurality of print job segments in a print distribution module;

computer readable program code for transmitting the plurality of print job segments to one or more distribution responsive printers;

computer readable program code for processing the plurality of print job segments into a plurality of print engine-ready data segments using the one or more distribution responsive printers;

computer readable program code for assembling the plurality of print engine-ready data segments from the one or more distribution responsive printers at the print distribution module; and computer readable program code for printing the plurality of print engine-ready data segments at a target printer when the plurality of segments is received from the print distribution module.

\* \* \* \* \*